US006475610B1

(12) United States Patent
Keener et al.

(10) Patent No.: US 6,475,610 B1
(45) Date of Patent: Nov. 5, 2002

(54) METHOD FOR COATING FAYING SURFACES OF ALUMINUM-ALLOY COMPONENTS AND FAYING SURFACES COATED THEREBY

(75) Inventors: Steven G. Keener, Trabuco Canyon; Norman R. Byrd, Villa Park, both of CA (US)

(73) Assignee: McDonnell Douglas Corporation, Seal Beach, CA (US)

( * ) Notice: Subject to any disclaimer, the term of this patent is extended or adjusted under 35 U.S.C. 154(b) by 0 days.

(21) Appl. No.: 09/578,144

(22) Filed: May 24, 2000

Related U.S. Application Data

(62) Division of application No. 09/151,343, filed on Sep. 11, 1998.

(51) Int. Cl.$^7$ .................................................. B32B 7/02

(52) U.S. Cl. ..................... 428/213; 428/423.1; 428/689

(58) Field of Search ................................ 428/212, 213, 428/423.1, 689

(56) References Cited

U.S. PATENT DOCUMENTS

| | | | | |
|---|---|---|---|---|
| 3,996,308 A | | 12/1976 | Douek et al. | |
| 4,405,427 A | * | 9/1983 | Byrd | 204/181 R |
| 4,588,838 A | * | 5/1986 | Byrd | 564/14 |
| 5,496,784 A | * | 3/1996 | Byrd | 502/152 |
| 5,614,037 A | * | 3/1997 | Keener | 148/537 |
| 5,858,133 A | | 1/1999 | Keener | |

FOREIGN PATENT DOCUMENTS

| | | |
|---|---|---|
| EP | 0 547 379 A2 | 6/1993 |
| EP | 0 785 243 A2 | 7/1997 |
| WO | WO 96/34993 | 11/1996 |

OTHER PUBLICATIONS

U.S. patent application Ser. No. 08/726,792, Keener, filed Oct. 07, 1996.

U.S. patent application Ser. No. 09/005,743, Keener, filed Jan. 02, 1998.

* cited by examiner

*Primary Examiner*—Cynthia H. Kelly
*Assistant Examiner*—B. Shewareged
(74) *Attorney, Agent, or Firm*—Alston & Bird LLP

(57) ABSTRACT

An aluminum-alloy, aircraft structural component having a faying surface prepared by treating with one or more curable organic coatings, one or more of which is optionally in an encapsulated state, and delivering a uniform coating on demand by rupturing and curing the encapsulated coating.

10 Claims, 5 Drawing Sheets

FIG. 1g
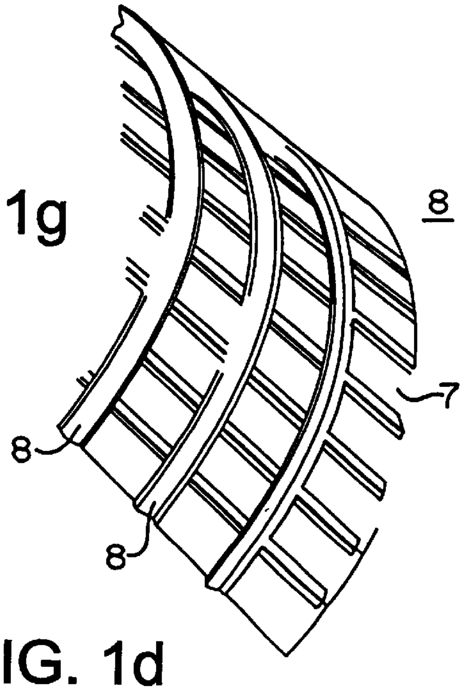
FIG. 1d
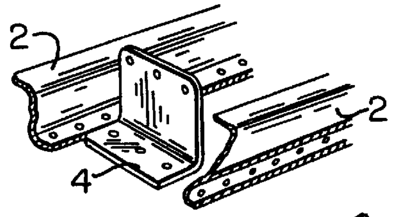
FIG. 1c
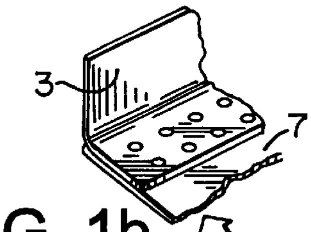
FIG. 1e
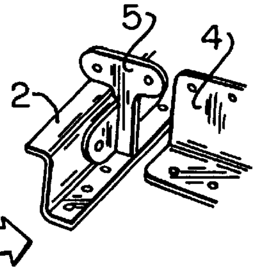
FIG. 1b
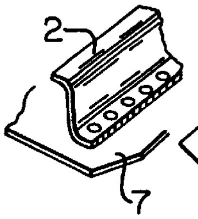
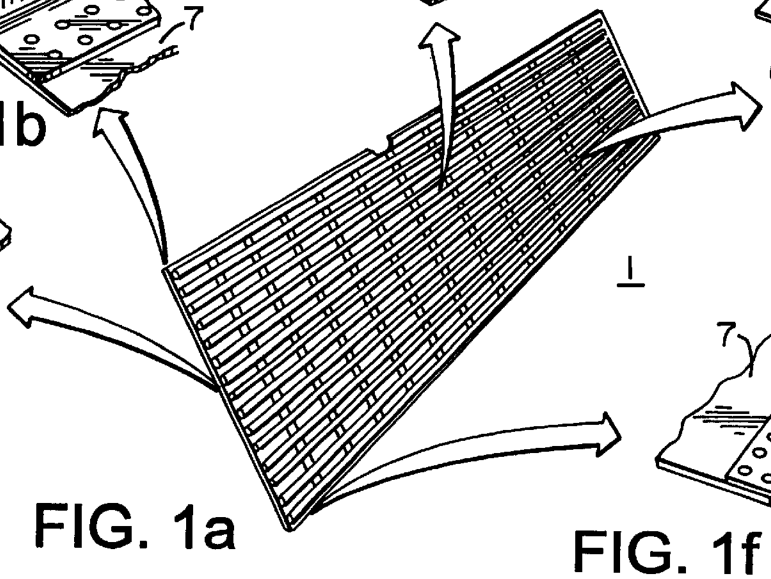
FIG. 1a
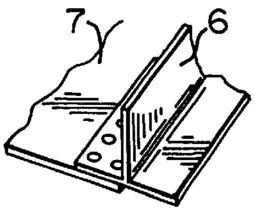
FIG. 1f

METHOD FOR COATING FAYING SURFACES OF ALUMINUM-ALLOY COMPONENTS AND FAYING SURFACES COATED THEREBY

CROSS-REFERENCE TO RELATED APPLICATIONS

This application is a divisional of U.S. application Ser. No. 09/151,343, filed Sep. 11, 1998 pending, which in incorporated by reference in its entirety.

BACKGROUND OF THE INVENTION

This invention relates to the preparation of coated, aluminum-alloy components and their installation and assembly. More specifically, the present invention relates to pre-treating surfaces of aluminum-alloy, aircraft structural components.

It has recently been discovered that the corrosion protection and ease of processing and assembly of certain, aircraft structural components can be improved by pre-treating the components with an organic, corrosion-inhibiting coating material prior to installation. It had been the conventional practice to coat such components with wet sealants that are known to require extensive and expensive special handling, especially with respect to their disposal. The pre-treatment method obviates the use of the wet sealants, reducing processing time and disposal costs. Such advances are the subject of commonly owned U.S. Pat. No. 5,614,037.

As disclosed in U.S. Pat. No. 5,614,037, it has been the practice to coat some types of fasteners in aircraft assemblies with organic coating materials to protect the base metal of the fasteners and surrounding adjacent structure against corrosion damage. In this usual approach, the fastener is first fabricated and then heat-treated to its required strength. After heat-treatment, the fastener is etched with a caustic soda bath or otherwise cleaned to remove any scale produced in the heat-treatment. The coating material, dissolved in a volatile carrier liquid, is applied to the fastener by spraying, dipping, or the like. The carrier liquid is allowed to evaporate. The coated fastener is then heated to an elevated temperature for a period of time to cure the coating; typically one hour at 400° F. The finished fastener is then ready to be used in the assembly of the airframe structure.

This coating methodology works well with fasteners made from base metals having high melting points, such as fasteners made of steel or titanium alloys. Such fasteners are heat-treated at temperatures well above the curing temperature of the coating. Consequently, the curing process of the coating, conducted after heat-treatment of the fastener is complete, does not adversely affect the properties of the already-treated base metal.

On the other hand, non-ferrous or aluminum alloys have a much lower melting point, and generally much lower heat-treatment temperatures, than steel and titanium alloys. It has not been the practice to coat aluminum-alloy, aircraft structural components such as wing and fuselage skin panels and fasteners, etc., with curable coatings, because it is observed that the elevated temperature required to cure the coatings adversely affects the resulting strength of the components. The aluminum-alloy, aircraft structural components must therefore be protected from corrosion attack by other methods that are extremely labor intensive, such as the use of wet sealants.

The inability to pre-apply these protective coatings forces aluminum-alloy, aircraft structural components such as wing and fuselage skin panels, etc. to be installed and assembled using wet-sealant compounds for the primary purposes of corrosion protection and pressure and fuel sealing. However, the wet-sealant compounds typically contain toxic, solvent-based compounds and therefore require multiple precautions for the protection of the personnel using them as well as their safe disposal to insure environmental protection. Such wet sealants are also messy and difficult to work with. In addition, wet sealants require extensive clean-up of the area around the fastener and adjacent structure. The clean up is conducted using caustic chemical solutions after the assembly process has been completed, and therefore represents an additional and expensive manufacturing step.

Wet-sealant compounds are also applied to the faying surfaces between components throughout the aircraft. For the purpose of this application, it is understood that "faying surfaces" are the interfaces of abutting or mating components that become so intimately and permanently fitted in relation to one another that the point of interface is virtually undetectable after assembly. The use of wet-sealant compounds on the faying surfaces of larger aircraft structural components results in additional waste, excessive application and clean-up time, toxic waste disposal complications, and increased cost.

There exists a need for an improved approach for the protection of the faying surfaces of these aluminum-alloy, aircraft structural components such as wing and fuselage skin panels, stiffeners (which include but are not limited to spars, ribs, stringers, longerons, frames, shear clips, "butterfly" clips, etc.), hinges, doors, etc., and the mechanical components attached to these aforementioned components. Furthermore, there exists a need for improving the delivery methods and systems of such coatings onto the aluminum-alloy, aircraft structural components, including relatively large, surface-area components.

SUMMARY OF THE INVENTION

It has now been discovered that the surfaces of aluminum-alloy, aircraft structural parts can be pre-treated in order to enhance processing of the critical faying surfaces while also improving corrosion protection, reducing or eliminating cleaning and other processing steps. In addition, the improved method of applying multiple pretreatment coatings to aluminum-alloy, aircraft structural components of the present invention allows for significant processing advantages in terms of improved coating thickness tolerances and uniformity, part storage, general handling, installation, and assembly.

The present invention provides a method for preparing and treating the surfaces of aluminum-alloy, aircraft structural components such as wing and fuselage skin panels, components collectively referred to as stiffeners, hinges, doors, etc., and the mechanical components attached to these aforementioned components. In addition, the present invention is particularly applicable for the improved processing of the faying surfaces of these aircraft components. The application of the coating utilizing this method does not either alter or affect the mechanical or metallurgical properties or performance of the components and does not adversely affect the desired, final performance of the assembled aircraft structure.

In accordance with one embodiment, the present invention comprises a method for preparing an aluminum-alloy, aircraft structural component providing an artificially-aged, aluminum-alloy precursor following solution heat-treatment that is not in its final heat-treated state and coating the precursor with a first organic coating. Optionally, an encapsulated, second coating is then applied to the first coating. The twice-coated component is then precipitation heat-treated, and placed into assembly position and assembled. Encapsulant should be a material that when either squeezed or crushed is of a chemical structure such that it becomes an integral part of the adhesive which it is encapsulating.

In a further embodiment, the present invention comprises providing a naturally-aged, aluminum-alloy, aircraft structural component and coating the component with a first coating. The once-coated component is subjected to an elevated or room temperature to cure the coating. A second coating is provided in an encapsulated state and applied onto the first coating. The twice-coated component is then subjected to an elevated or room temperature environment to cure the second coating. The component is then placed into assembly position and contacted to a second component by applying a temperature or pressure change such as a compressive assembly force sufficient to liberate the second coating from its encapsulated state thereby creating a bonded interface between components.

In yet another embodiment, the present invention comprises providing a naturally-aged, aluminum-alloy, aircraft structural component and coating the component with a first coating. Optionally, a second coating is provided in an encapsulated state and applied onto the first coating. The coated component is then subjected to an elevated temperature environment to cure the coating. The component is then placed into assembly position and contacted to a second component by applying rupture conditions such as a compressive assembly force sufficient to liberate the second coating from its encapsulated state thereby creating a bonded interface between component and coating.

In yet a further embodiment, the present invention comprises providing either an artificially-aged or a naturally-aged, aluminum-alloy, aircraft structural component, coating the component with a first coating, followed optionally by applying an encapsulated, second coating. A protective release paper is then provided to the component to cover the encapsulated, coating layer prior to assembly.

Still further, the present invention comprises providing an artificially-aged, aluminum-alloy, aircraft structural component following solution heat-treatment that is not in its final heat-treated state. A first organic coating is applied to the component, followed by precipitation heat-treating the coated component. The coated component is then coated with an encapsulated, second coating. The coated component is then subjected to either an elevated or room temperature environment to cure the second coating. The twice-coated component is then placed into assembly position and contacted to a second component with a compressive assembly force applied sufficient to liberate the second coating from its encapsulated state thereby creating a bonded interface between component and coatings.

In still a further embodiment, the present invention contemplates providing an artificially-aged, aluminum-alloy, aircraft structural component in its final heat-treated state. A first coating is applied to the component optionally followed by applying an encapsulated, second coating. The component is then subjected to an elevated temperature environment to cure the two coatings. A protective release paper designed to protect the twice-coated component is optionally applied to the surface of the twice-coated component. The component is then placed into assembly ready position, the protective release paper is removed exposing the second coating. The component is then contacted to another component for final assembly. The coated component is then compressed against a second structural component in its final assembly position. The assembly compression force is sufficient to rupture the adhesive encapsulations contained in the second coating material. The second coating material reacts between the first coating and the adjacent, second structural component to enhance the overall adherence of the surface of the first component with that of the second component. The second coating material provides an enhanced bond between the faying surface of the two structural components.

In yet another embodiment, an artificially-aged, aluminum-alloy, aircraft structural component is provided in its final heat-treated state. A first coating is applied followed by either a room temperature or elevated temperature exposure to cure the first coating. A second coating is then applied to the once-coated component followed by either a room temperature or elevated temperature exposure to cure the second coating. Release paper is then optionally applied to the second coating and removed prior to assembling the component on the airframe.

Other features and advantages of the present invention will be apparent from the following more detailed description of the preferred embodiment, taken in conjunction with the accompanying drawings, which illustrate, by way of example, the principles of the invention.

BRIEF DESCRIPTION OF THE DRAWINGS

FIG. 1*a* shows a wing panel sub-structure.

FIGS. 1*b*–1*f* show enlarged partial views of component aspects of the wing panel where faying surfaces occur:

FIG. 1*g* shows a section of fuselage skin attached to a frame section.

DETAILED DESCRIPTION OF THE INVENTION

Figure 2:
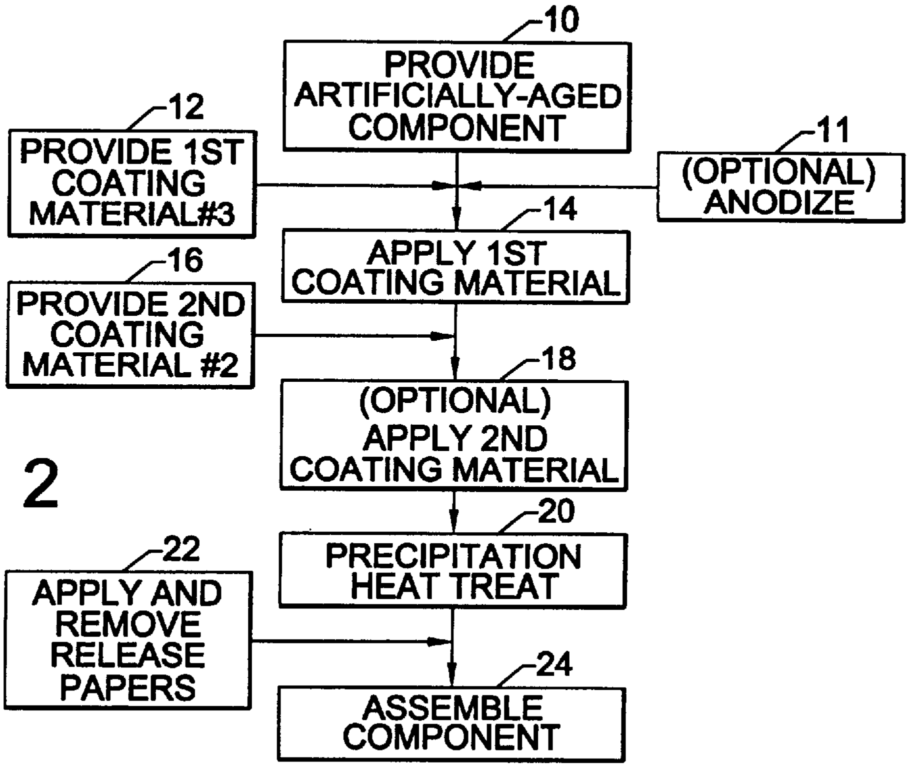
FIG. 2 is a process flow diagram for a method of the invention using an artificially-aged alloy and curing of both coatings with precipitation heat-treatments.

The invention of the present invention relates to any aircraft structural components such as wing and fuselage skin panels stiffeners, stringers, spars, clips, frames, etc., where faying surfaces exist. FIG. 1*a* shows an aircraft wing panel assembly 1 prior to affixing the aluminum skins. The panel assembly 1 2 comprises hardware shown in enlarged FIGS. 1*b*–1*f*. FIG. 1*b* shows a stringer 2 attached to wing panel skin 7. FIG. 1*c* depicts a spar cap 3 attached to wing panel skin 7. FIG. 1*d* shows an angled shear clip 4 in position between stringers 2. FIG. 1*e* shows a butterfly clip 5 in position adjoining a stringer 2 and a shear clip 4. FIG. 1*f* shows a center spar clip 6 affixed to a section of wing panel skin 7. Finally, FIG. 1*g* depicts a section of fuselage structure showing framing 8 affixed to fuselage skin 7. These components preferably have their faying surfaces "pre-coated" following the completion of their normal fabrication cycle, but prior to final assembly. Large sections of aluminum also could be coated during or after final assembly.

FIG. 2 shows one preferred method of the present invention. In this embodiment, an artificially-aged (and optionally anodized 11), aluminum-alloy component 10 and the first coating material 12 are provided with the coating applied thereto 14. The component 10 is not in its final heat-treated state. A second coating 16 optionally is provided and applied 18 thereto. If a second coating is applied, the twice-coated component is precipitation heat-treated 20. Release paper is then optionally applied and adhered 22 to the twice-coated component. The paper is removed prior to assembling the component. The component is then positioned and assembled 24. In a preferred embodiment, either one or both of the first and second coatings are encapsulated. The encapsulant material preferably is activated when surface pressure is applied.

Figure 3:
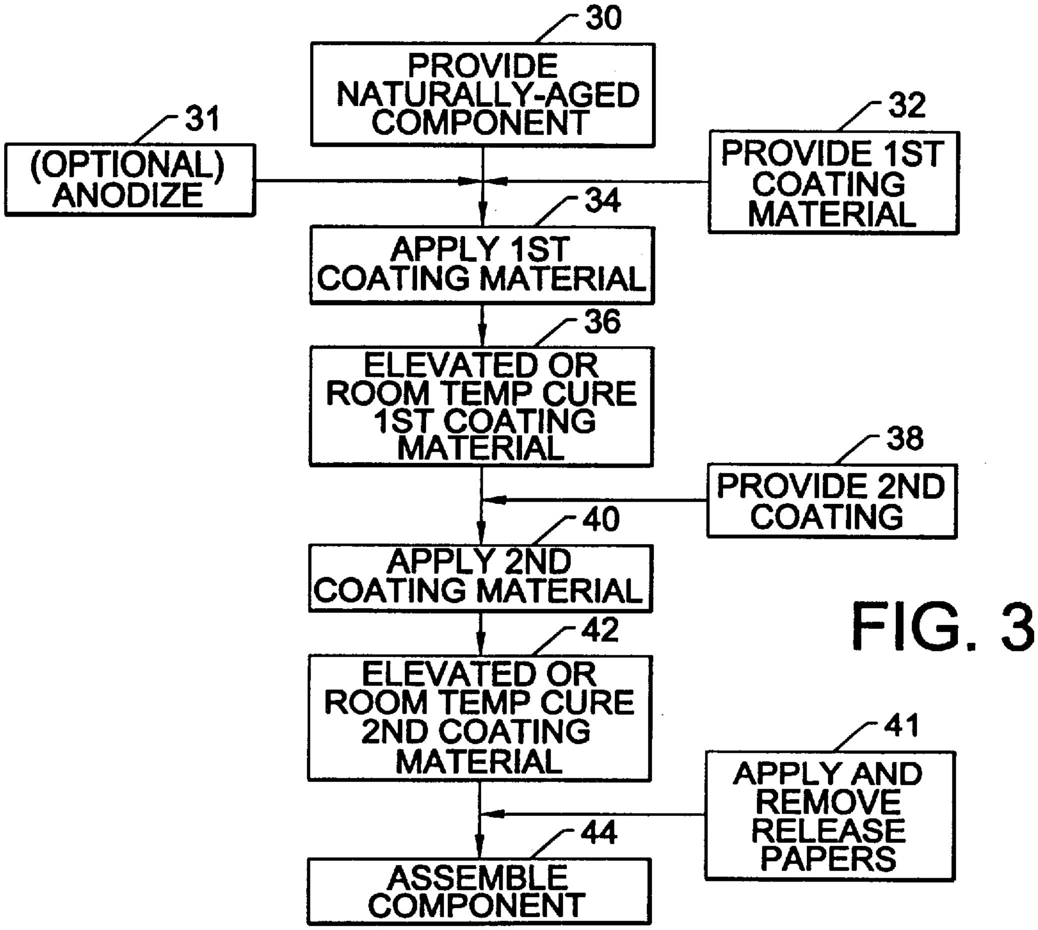
FIG. 3 is a process flow diagram for one form of a method of the invention comprising a naturally-aged alloy and curing each coating individually at either room or elevated temperature.

FIG. 3 shows an alternate method of the present invention wherein a first coating material 32 is provided and applied 34 to the component 30 followed by either a room or elevated temperature cure step 36. As in the process of FIG. 2, the component may be optionally anodized 31 prior to first coating 34. A second coating material 38 is provided and applied 40 to the component 30. A second cure step occurs 42 at either room or elevated temperature before the now twice-coated and twice-cured component is positioned for assembly 44. As with the method of FIG. 2, it is particularly preferred that either one or both of the first and second coatings comprise encapsulations.

Figure 4:
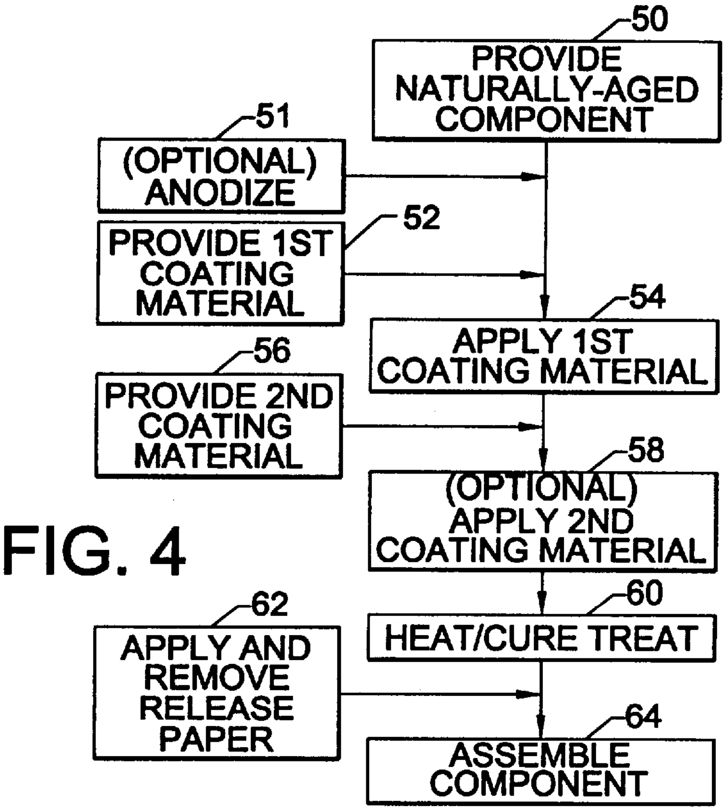
FIG. 4 is a process flow diagram for a method of the invention where the multiple coatings are cured together at either room or elevated temperature.

FIG. 4 shows another method of the present invention. A naturally-aged, aluminum-alloy component 50 is optionally anodized 51 and immediately coated with a first coating material 54 that has been provided 52. Optionally, a second coating material is provided 56 and applied 58 to the component. The twice-coated component is then subjected to either room or elevated temperatures 60 for curing. Release paper is then optionally applied 62 to the component until the component is to be used. The paper is then removed from the component and the component used in assembly 64. It is understood that the release paper is itself a protective film, or comprises a protective film.

Figure 5:
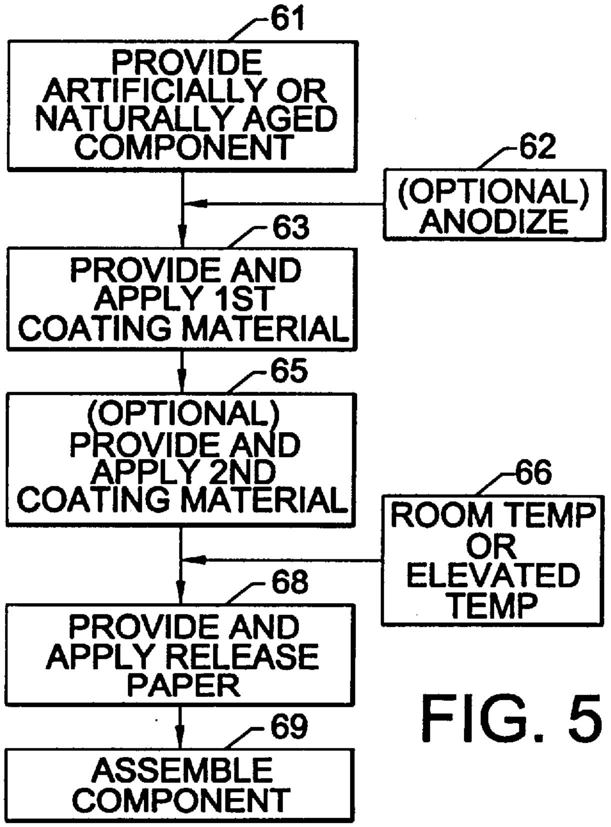
FIG. 5 is a process flow diagram for a method of the invention wherein either naturally or artificially-aged alloy components have both coatings cured at room temperature.

In FIG. 5, the component 61 is either an artificially or a naturally-aged alloy in its final heat-treated state. The component is optionally anodized 62 and then coated with a first coating 63, followed by an optional second coating 65. The component 61 is then cured at room or elevated temperature 66. As with FIGS. 2–4, it is understood that a releasable film 68 is optionally applied to the component after the second coating is applied. The film is then removed from the component without disturbing the coatings, prior to positioning and assembling the part 69. As with FIGS. 2–4, it is particularly preferred that either one or both of the first and second coatings be encapsulated.

Figure 6:
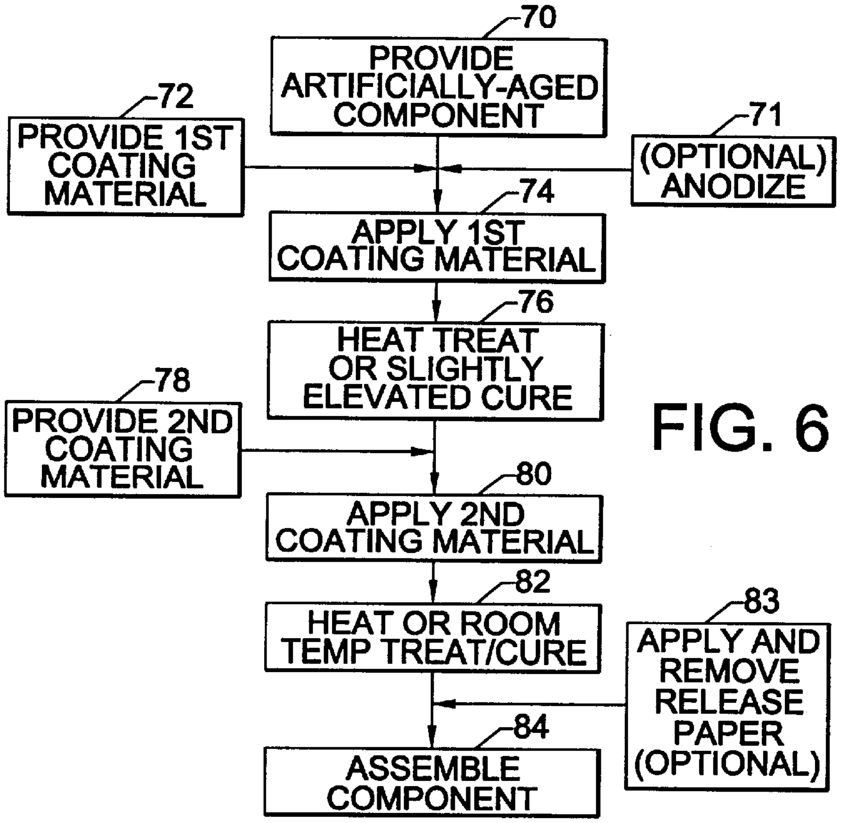
FIG. 6 is a process flow diagram for a method of the invention wherein artificially-aged alloy components have the primary coating cured by precipitation heat-treatment with a second coating applied followed by either a room or elevated temperature cure.

In FIG. 6, the artificially-aged component 70 is optionally anodized 71 and has a first coating 72 that is applied 74 and followed by precipitation heat-treatment 76. An encapsulated second coating 78 is applied 80 onto the first coating. The component can be subjected to either a room or elevated temperature cure process 82. A release paper or film 83 is then optionally applied to the cured second coating, and subsequently removed upon assembly. The twice-coated component is then positioned for assembly 84.

Figure 7:
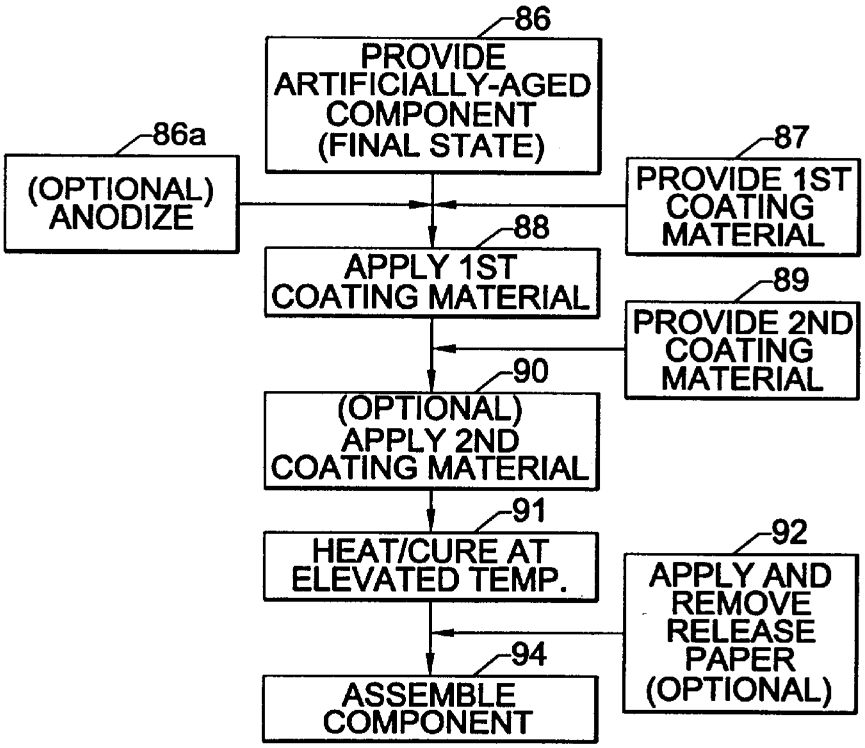
FIG. 7 is a process flow diagram for a method of the present invention using an artificially-aged alloy component in its final state where either one or both of the coatings are cured simultaneously at elevated temperature.

FIG. 7 depicts a block flow diagram representing a variation of the embodiment shown in FIG. 5. In FIG. 7, an artificially-aged, aluminum-alloy component 86 is provided in its final heat-treated state. The component is optionally anodized **86*a* and is coated respectively 88, 90 with a first 87 and optionally a second coating 89, then heat cured 91 at an elevated temperature. Release paper is optionally applied to the second coating 92 and removed prior to assembling the component 94**.

Figure 8:
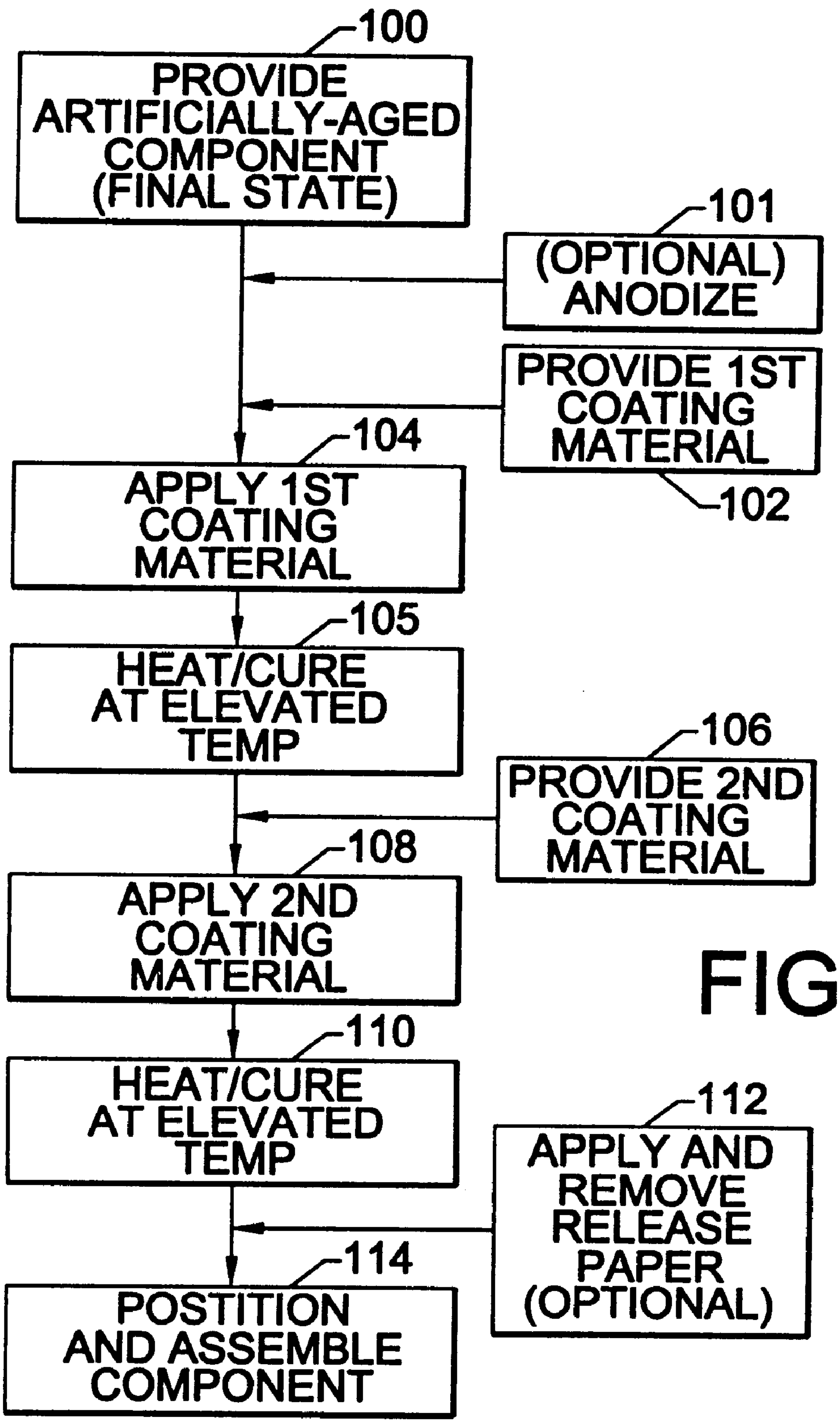
FIG. 8 is a process flow diagram for a method of the present invention using an artificially-aged alloy component in its final state where each coating is subjected to a separate elevated temperature cure.

In FIG. 8 an artificially-aged, aluminum-alloy component 100 is provided in its final or finished, heat-treated state. A first coating is provided 102 and applied 104. The coated component is then cured at an elevated temperature 105. The second coating is provided 106 and applied 108 and subjected to a second, elevated heat environment 110 to cure the second coating. Release paper is again optionally applied 112, and the component is positioned and assembled 114. As with FIGS. 2–7, the component is then exposed to an assembly compressive force sufficient to overcome the structural integrity of the adhesive encapsulations, and adhere the component in place.

As with the above-described methods, it is particularly preferred that either one or both of the first and second coatings be encapsulated. In this instance, the assembly compressive force supplied to the twice-coated component is sufficient to liberate the coatings from their encapsulated state. A protective releasable film is preferably applied to the twice-coated component to protect the coatings during storage, delivery, handling, installation or final positioning, and then may be removed prior to contacting the component to another mating structural component in its final orientation. The component is then compressed in the assembled state to activate the encapsulated, adherent composition in either one or both of the coatings.

Many variations of the above-stated methods are contemplated by the present invention. For example, in one variation (not shown), a releasable film may be coated with one or more coatings. The coated, releasable film may then be applied to the component to be treated. Before or after curing as desired, the film may be released, leaving a component coated and ready for handling and placement into its final assembly position. The film may be a paper, polyethylene, plastic or laminate, or any suitable material as would be understood by one skilled in the films and coatings field.

It is further understood that the elevated temperature curing steps may be conducted in conjunction with adjustments in the cold-working levels of the components achieved during fabrication so as to achieve the desired results on the aluminum alloy and the coating or coatings thereon. In certain embodiments, component and coating thermal treatments may be effected at either room temperature, or at temperatures and associated times lower than normal heat-treating times and temperatures for example, from about 150 to about 375 degrees F. for periods of about 10 minutes to about 1 hour, if certain additional levels of cold-work in the material are present.

The aluminum-alloy precursor component, and the finished component, preferably may be made of an aluminum alloy having a temper achieved by artificial-aging to its final state. This precursor component preferably is provided in a solution-treated/annealed condition suitable for the subsequent utilization of a strengthening, precipitation heat-treatment, but is not as yet in its final, heat-treated state. Optionally, the precursor is anodized, preferably in a chromic-acid solution, to improve the chemical and mechanical adhesion of the subsequently applied coating to the precursor, and also preferably without sealing the anodized surface of the precursor.

The organic coating material, in a liquid, encapsulated state, is applied to the anodized, unsealed surface of the precursor which is not in its final heat-treated state. In this embodiment, the heat-treatment of the precursor component is thereafter completed to bring the finished component to its full strength by heating to an elevated temperature in a precipitation heat-treatment. The coating is simultaneously cured while achieving the component's required metallurgical properties during the precipitation heat-treatment/aging according to the combination of temperature(s), time (s), and environment(s) specified for the particular aluminum-alloy base metal of the aircraft component. Thus, no separate curing procedure is required for the coating after the coated component has been heat-treated.

In another preferred embodiment, the components include those made of an aluminum alloy having a temper that is achieved by natural-aging. The distinction between artificial and natural-aging is that during precipitation heat-treatment, artificial-aging involves heating the component to an elevated temperature for a prolonged period. Natural-aging is accomplished at room temperature over an extended period. In the present invention, the component may be plastically deformed by cold-working the component during the fabrication process prior to coating with the organic coating material and subsequent to natural-aging. The component is then coated and subsequently treated with a modified thermal treatment to cure the coating and simultaneously provide some stress relief or annealing. The additional deformation or cold-working provided to the component during fabrication, and prior to curing of the coating, enables the component's material properties to fall within the acceptable limits when the component is subjected to the elevated temperature conditions needed to cure the coating.

The component of the present invention may not be heat-treated, but instead may be in a final deformation state that has had significant levels of cold work applied to its metallurgical structure, either before or during fabrication. In this embodiment, the precursor preferably is 1) over-deformed to a deformation state greater than that required in the final component; 2) optionally anodized in chromic-acid solution and unsealed; 3) coated with the organic coating material; and then 4) heated to cure the coating and partially anneal the precursor to the required deformation state.

It is further understood that additional, encapsulated coating layers may be provided to the first coating layer. Preferably, the second coating is an accelerator or adhesive coating, preferably containing encapsulated particles of adhesive held in suspension. As with the first encapsulated layer, a temperature or pressure change is imposed on the coated component. The preferred encapsulant preferably has a chemical structure such that it becomes an integral part of the adhesive which it is encapsulating. Preferred encapsulant material include polyurethanes, polyvinylchlorides, silicones, epoxies, acrylates, polyimides, and phenolics, with acrylates being particularly preferred.

The present invention also contemplates the manufacture of any aluminum-alloy, aircraft structural components compatible with a selected corrosion-inhibiting coating formulation and requiring an aging/curing period. The aging/curing period can be conducted at either an elevated or room temperature environment for a length of time to facilitate curing. Once cured, it is preferred that the coating be tack-free to enable handling.

The coating thickness achievable by the present invention may vary according to the preferred end-result characteristics of the coated component and the coating itself. Preferably, the first coating thickness ranges from about 0.005 inch to about 0.010 inch. The second coating thickness preferably ranges from about 0.0005 inch to about 0.0015 inch.

The preferred corrosion-inhibiting coatings are those capable of minimizing the passage of water, acids, or bases from the ambient, environmental surroundings to the aluminum substrate. Thus, such coatings are either hydrophobic materials and/or sacrificial substances, e.g, $SrCr_2O_4$ or other chromates, etc. Such useful coatings include hydrophobic coatings such as, polyethylene, polyethylene/tetrafluoroethylene copolymers, phenolics, epoxies, polyimides, polyurethanes, polyvinylchlorides, silicones and novolaks, with and/or without chromate fillers, with polyurethanes/polyureas being the most preferred.

Novolaks are phenol/formaldehyde polymers that are formed by reacting phenol with less than an equivalent amount of formaldehyde (i.e., approximately 1:0.8 mole ratio) in an acid catalyzed reaction. This results in a more flexible polymer than the standard phenol formaldehyde which allows for ease of handling and application prior to it being further crosslinked at a later stage. Thus, novolaks can be applied to a substrate and later crosslinked by the addition of, for example, hexamethylene tetramine.

The second coating applied to the first protective coating preferably comprises an adhesive or primer, and is similar to those coatings used for the bonding of aircraft structural panels. Preferred coatings are those capable of minimizing the passage of water, acids, or bases from the ambient environment to the aluminum substrate, and are also capable of bonding to the substrates as well as being a sealant. Additionally, the second coating is capable of adsorbing encapsulated coatings for use in further bonding and sealant needs. Such coatings include phenolics, epoxies, melamines, and polyurethanes, with polyurethane/polyurea being most preferred.

In accordance with the present invention, it is most preferred if the second coating alone, or both the first and second coating are encapsulated. The coatings are encapsulated according to known encapsulation techniques. Encapsulation is a process whereby one substance, A, is dispersed in a medium in which this first substance is not soluble. As a high-speed stirring and shearing action is applied to disperse the substance A into a fine, colloidal particle, a second substance, B, is added which may be in a monomeric form. This second substance B is then polymerized, while still undergoing the high-speed stirring. This allows substance A to be encapsulated with the second substance, polymer B. Alternatively, substance A may be obtained in a fine particulate form and added to a solution of substance B, which coats the particulates of substance A. The resultant mixture is blown into an evacuated chamber. The solvent used in preparing the solution containing substance B is then removed under vacuum causing the encapsulated particles to precipitate and collect on the bottom of the chamber.

The encapsulated coatings may be delivered to the component surface by any acceptable method known in the field of spray coatings. An encapsulated coating, when dispersed in an aqueous or non-aqueous medium, can be sprayed onto the substrate. When the non-solvent carrier evaporates away or dries out, the encapsulated particles are left behind. Alternatively, the encapsulated particles can be electrostatically sprayed onto the substrate surface. It is further contemplated that the second coating preferably use microsuspension bead-technology similar to the known technology in the laser jet ink field. In this way, the second coating applied to the once-coated component preferably bursts upon impact to deliver a relatively uniform, final coating of from about 0.0005 inch to about 0.0015 inch.

It is contemplated that this microsphere or bead-like delivery system can be used to deliver various types of useful initiators or catalysts to an aircraft structural component. Such initiators may be in any state and may be Friedel-Crafts ionic catalysts such as, but not limited to metal halides, acids, amines, boron trifluoride, boron trifluoride-etherate, etc. The catalyst chosen is preferably matched to the aging/curing requirements of each particular application.

For handling purposes, it is preferred that the coated component surface be tack-free. This requires that the coating be cured via either a room or elevated temperature treatment, pressure treating, or irradiation, etc. Preferably a coating is allowed to rest at room temperature on the component surface and become tack-free after a suitable time, e.g. from about 2 to about 4 hours. Still further, it is contemplated that the second, encapsulated coating is delivered to the once-coated component and cured after a short time; from about 10 to about 30 minutes.

In addition, to assist in handling the coated component, a releasable paper or film may be placed over the coating for protection. The film preferably is designed to release from the coating's surface without disturbing the coating or its surface. However, it is contemplated that the release paper could activate the coating it covers upon its removal therefrom. It is further contemplated that the releasable film itself could be coated with one or more coatings that are then transferred to the component surface being treated, followed by an optional curing protocol. The releasable film is then removed from the component, leaving the cured film adhered and cured to the component surface. Preferred films or release papers include glassine paper, fluorinated ethylene/propylene copolymer (FEP) film, kraft paper, Armalon film (fluorinated release film), IVEX Corp. release papers such as CP-96A (a glossy coating on a 112# basis weight class paper) and IVEX LC-19 papers with CP-96A or IVEX LC-19 papers being particularly preferred.

The preferred selected temperature curing regimen for the present invention is governed by the availability of the active catalyst/initiator and the reactivity of the catalyst/initiator with the monomer or organic compound comprising the first coating. For example, benzoyl peroxide preferably heated to about 80° C. is a suitable polymerization initiator in a free radical polymerization of some vinyl monomers, such as styrene. However, benzoyl peroxide can also be used at lower temperature if higher pressures are provided. In addition, the selected catalyst for the second coating may be an active catalyst; i.e. decomposable at room temperature, such as, e.g., liquid peroxide in the presence of a tertiary amine. However, it is often necessary to allow such reactive monomers or others such as adhesives (low molecular weight polymers) to be mixed and applied to a substrate in position before it is subjected to a further reaction, such as polymerization, curing, bonding, etc. to another adhesive surface. It is therefore preferred to mix all components in a carrier medium to achieve a relatively homogeneous state prior to placement on a substrate. This applies to monomers with catalysts and also adhesive films applied for subsequent bonding. In this way the coatings are applied such that no chemical action occurs until desired through applying, for example, a temperature or pressure change. In other words, the active materials to be reacted are "protected" from reacting prematurely. Therefore, in one particularly preferred embodiment of the present invention all "active" species are provided in an inert medium, but available for use on demand, even at room temperature.

As mentioned, one preferred method is to encapsulate such "active" materials in a protective, colloidal, sphere-like pellet or ball which, upon being subjected to a specified temperature or pressure, breaks or ruptures in a predictable way, thus coating the aluminum component precursor surface substantially uniformly. This described encapsulation coating technique of the present invention, also can be used for any catalyst or initiator for any reaction such as polymerization, crosslinking polymer adhesives, bonding adhesives to substrates, curing elastomers, or any other reaction where a room temperature catalyst may be needed, but only on demand. This above-described technique is versatile enough to be used with solid, liquid or gaseous materials, including metal salts or inorganic compounds such as $BF_3$. In addition, encapsulated adhesives may be used latently to achieve release, by applying the encapsulations to the substrate, then later applying the required pressure or temperature changes needed to liberate the encapsulated coating contents.

It is understood then, that the encapsulations or pellets, applied to either the component substrate or a coating can be ruptured in any desired fashion including simply compressing two components together during or after assembly. Once such pellet layers "burst" due to compressive or other forces, a desirable, adhesively-bonded interface is achieved between the components. Such a bonding process greatly enhances the integrity of the primary or base coating to the faying surface interfaces of the structural components, resulting in enhanced corrosion protection and improved pressure sealing characteristics.

In addition, according to the present invention, by obviating the use of a wet-sealant at faying surfaces during aircraft component assembly and instead "pre-coating" the components with protective, tack-free coatings, improved tack-free surfaces are produced. Such surfaces enable the components to be handled during processing and assembled in an automated manner thus greatly reducing production cost and cycle time.

The preferred embodiments of the present invention relate to the preparation of aluminum-alloy, aircraft structural components and the following discussion will emphasize such articles. The use of the invention is not limited to components such as aircraft wing and fuselage skin panels, hinges, doors, etc., and instead is more broadly applicable. However, its use in aircraft structural components offers particular advantages. The procedures of the present invention in no way inhibit the optimum performance of the alloy components. To the contrary, the present methods allow the components to maintain their optimum mechanical and metallurgical properties while providing equivalent and or improved levels of corrosion protection and pressurizations without the disadvantages associated with the wet-sealant approach.

As used herein, "aluminum-alloy" or "aluminum-base" means that the alloy has more than 50 percent by weight aluminum but less than 100 percent by weight of aluminum. Typically, the aluminum-base alloy has from about 85 to about 98 percent by weight of aluminum, with the balance being alloying elements, and a minor amount of impurity. Alloying elements are added in precisely controlled amounts to predictably modify the properties of the aluminum alloy. Alloying elements that are added to aluminum in combination to modify its properties include, for example, magnesium, copper, and zinc, as well as other elements.

In one case of interest, the aluminum alloy is heat-treatable. For aircraft structural components having faying surfaces such as wing and fuselage skin panels, stiffeners, frames, doors, hinges, etc., it is preferred that such components would have their faying surfaces "pre-coated" following the completion of their normal fabrication cycle but prior to final assembly, although coating of large sections of aluminum also could be coated during or after final assembly. The component such as a wing skin panel or wing skin panel stiffener such as a stringer is first fabricated to a desired shape. The alloying elements are selected such that the fabricated shape may be processed to have a relatively soft state, preferably by heating it to an elevated temperature for a period of time and thereafter quenching it to a lower temperature. This process is termed "solution heat-treating" or "annealing." In the solution heat-treating/annealing process, solute elements are dissolved into the alloy matrix (i.e., solution-treating) and retained in solution by the rapid quenching, and the matrix itself is simultaneously annealed.

After the component is solution-treated/annealed, it may be further processed to increase its strength several fold to have desired high-strength properties. Such further processing, typically by a precipitation-hardening-lagging process, may be accomplished either by heating to an elevated temperature for a period of time (termed artificial-aging) or by holding at room temperature for a longer period of time (termed natural-aging). In conventional, Aluminum Association terminology, different artificial-aging, precipitation heat-treatments (some in combination with intermediate deformation or cold working), produce the basic T6, T7, T8, or T9 temper conditions. A natural-aging precipitation treatment produces the basic T3 or T4 temper conditions. Aluminum Association terminology for heat-treatments, alloy types, and the like are understood by those skilled in the metallurgical field, and will be used herein. Some alloys require artificial-aging and other alloys may be aged in either fashion. The treated structural components of the present invention are commonly made of both types of materials.

In both types of aging, strengthening occurs as a result of the formation of second-phase particles, typically termed precipitates, in the aluminum-alloy matrix. Collectively, all of the processing steps leading to their strengthening are generally termed "heat-treating", wherein the component is subjected to one or more periods of exposure to an elevated temperature for a duration of time. Heating and cooling rates are selected to aid in producing the desired final properties. The temperatures, times, and other parameters required to achieve particular properties are known to those skilled in the field of aluminum-base alloys and metallurgy.

The 7150 alloy is a specific, artificially-aged, aluminum-base alloy of particular interest for aircraft structural applications. The 7150 alloy has a composition of about 2.2 percent by weight copper, about 2.3 percent by weight magnesium, 6.4 percent by weight zinc, about 0.12 percent by weight zirconium and balance of aluminum plus minor impurities. Other suitable alloys include, but are not limited to, 2000, 4000, 6000, and 7000 series heat-treatable aluminum alloys. The 7150 alloy is available commercially from several aluminum companies, including ALCOA, Reynolds, and Kaiser.

After the component is fabricated to the desired shape, the 7150 alloy is fully solution-treated/annealed to have an ultimate tensile strength of about 42,000 pounds per square inch (psi) and yield strength of about 24,000 psi with an ultimate elongation of about 12% or as otherwise required. This state is usually obtained following the component's fabrication processing including machining, forging, or otherwise forming the component into the desired shape. This condition is termed the "untreated state" herein, as it precedes the final aging/precipitation heat-treatment cycle required to optimize the strength and other properties of the material. The component may be subjected to multiple forming operations and is periodically re-annealed as needed, prior to the strengthening, precipitation heat-treatment process. After forming (and optionally re-annealing), the 7150 alloy may be heat-treated at a temperature of about 250° F. for about 24 hours.

An alternative two-stage heat treatment may be used. This treatment is comprised of first heat-treating the component at a temperature of about 225° F. from about 6 hours to about 8 hours. The temperature is thereafter increased from about 250° F. to about 350° F. for a period from about 6 hours to about 10 hours, followed by an ambient air cool. This final state of heat-treatment, termed T77511 condition, produces a strength of from about 82,000 psi to about 89,000 psi in the 7150 alloy, which is suitable for aircraft structural component applications.

It is understood that additional, optional steps may be inserted into the above-described preferred methods. In one particularly preferred optional step, the component is initially optionally chemically-etched, grit-blasted or otherwise processed to roughen its surface, and thereafter anodized in chromic-acid solution. Chromic-acid solution is available commercially or prepared by dissolving chromium trioxide in water. The chromic-acid solution is preferably of a concentration of about 4 percent chromate in water, and at a temperature of from about 90° F. to about 100° F. The article or component to be anodized becomes the anode in the mildly agitated chromic-acid solution at an applied DC voltage of from about 18 volts to about 22 volts. Anodizing is preferably continued for from about 30 minutes to about 40 minutes, but shorter times were also found to be sufficient. The anodizing operation produces a strongly adherent oxide surface layer from about 0.0001 inches to about 0.0003 inches thick on the aluminum-alloy article, which surface layer promotes the adherence of the subsequently applied first organic coating.

The optional anodizing process, preferably in chromic acid, conducted prior to application of the coating serves to promote strong chemical and mechanical bonding of the organic coating to the aluminum-alloy article substrate. The bonding is apparently promoted both by physical, mechanical interlocking and chromate-activated, chemical bonding effects. To enhance the physical, mechanical interlocking effect, the anodized surface is not chemically-sealed against further water intrusion after the anodizing process. The subsequently applied and cured organic coating serves to seal the anodized surface.

The first coating material described above is preferably provided in about 100% low-viscosity solid solution or "neat" material so that it may be readily and evenly applied. The usual function of the coating material is to protect the base metal to which it is applied from corrosion, including, for example, conventional electrolytic corrosion, galvanic corrosion, and stress corrosion. The first coating material is a formulation primarily comprising an organic composition, but also may contain additives to improve the properties of the final coating. The coating may also be desirably dissolved initially in a carrier liquid and encapsulated. After application, the coating material is subjected to an environmental change of temperature and/or pressure to rupture the encapsulation. The coating is thus released to the component's substrate surface where it is subsequently cured to effect structural changes within the organic coating, typically crosslinking organic molecules to improve the adhesion and cohesion of the coating.

A number of curable, organic coating materials are available and may be used in the present process. A preferred coating material of this type comprises resin mixed with one or more plasticizers, other organic components such as polytetrafluororoethylene, and inorganic additives such as aluminum powder and/or chromates, such as strontium chromate, barium chromate, zinc chromate, and the like. One such preferred first curable organic coating is Hi-Kote $^{F}/_{S}1$™ produced by the Hi-Shear Corp. (Torrance, Calif.). Alternatively, non-chromated coatings may be used. These coating materials are preferably dispersed in a suitable solvent present in an amount to produce a desired consistency depending upon the application selected. The solvent may be an ethanol mixture but preferably is an aqueous medium. Phenolics, urethanes (polyurethanes and ureas), epoxies, melamines, acrylates, and silicones are representative examples of the preferred encapsulated adhesives in the second coating. A preferred second coating is the polyurethane/urea-based HI-Kote $^{F}/_{S}2$™ produced by the Hi-Shear Corp. (Torrance, Calif.).

In the preferred embodiments, the base metal of the aircraft structural component and the applied coating are together heated to a suitable elevated temperature, to achieve two results simultaneously. In this single step, the aluminum alloy is precipitation heat-treated by artificial-aging to its final desired strength state, and the coating is cured to its desired, final bonded state. Preferably, the temperature and time for this thermal treatment is selected to be that required to achieve the desired properties of the aluminum-alloy, base metal, as provided in the industry-accepted and proven process standards for that particular aluminum-base alloy.

As disclosed herein, the curing of the coating can sustain larger variations in time and temperature with acceptable results compared with the heat-treatment of the metal. In accordance with the present invention, the cured coatings exhibit acceptable material properties as well as satisfactory adhesion to the aluminum-alloy substrate and other related properties during service.

In the case of the preferred 7150 aluminum-base alloy and 'Hi-Kote F/S' coating representative of those coatings discussed above, the preferred heat-treatment is the T77511 precipitation heat-treatment aging process of 7150 alloy 6–8 hours at 225° F., followed by a ramping up of from 225° F. to 350° F., followed by maintaining the temperature at 350° F. for 6–10 hours, with an ambient air cool to room temperature.

Thus, the precipitation heat-treatment procedure of the artificially-aged, aluminum-alloy component involves significantly longer times at different temperatures than is recommended by the manufacturer for the organic coating. There was initially a concern that the higher temperatures and longer times, beyond those required for the standard curing procedure of the coating, would degrade the coating and its properties during service. However, it was discovered that the first coating strongly adhered to the base metal aluminum alloy and was also strongly internally coherent. The first coating is preferably from about 0.005 to about 0.010 inch thick after heat-treating.

The second encapsulated coating, i.e. phenolic, urethane, melamine, etc., preferably is dispersed in an aqueous medium and coated onto the substrate. The solvent, preferably water, is allowed to evaporate leaving behind the particles of encapsulated coating. The final coating thickness is from about 0.0005 inch to about 0.0015 inch. The coated component is then ready for assembly appropriate to its type. In the case of the wing panel, it is assembled to the various stringers, ribs, spars, etc.

The installation step reflects one of the advantages of the present invention. If the coatings were not applied to the component before assembly, it would be necessary to place a viscous, wet-sealant material onto the faying surfaces to coat the contacting surfaces as the mating components are either assembled or installed. The wet-sealant material is potentially toxic to workers, messy and difficult to work with, and necessitates extensive cleanup (of both tools and the exposed surfaces of the resulting aircraft section) with caustic chemical solutions after component installation. Moreover, it has been observed that the presence of residual, wet-sealant inhibits the adhesion of later-applied paint or other top coats onto the assembled components. The present coating approach overcomes these problems. As a result of the present invention, wet-sealant is not needed or used during installation and consequent assembly.

Further, it is highly advantageous to apply the protective fay-surface coating of the present invention to aluminum-alloy, aircraft structural components to facilitate automated part assembly and inspection. Since the parts are precoated, there can be no chance of human error as to the proper treatment of a faying surface. The present invention further enhances the integrity, consistency and performance of aircraft faying surfaces, as well as improving existing part storage, general handling, installation, and assembly systems. In short, the present invention allows for the coated components to retain all mechanical and metallurgical properties, and the required degree of corrosion protection, without any of the disadvantages of the conventional wet sealant corrosion treatments.

Many other modifications and variations of the present invention are possible to the skilled practitioner in the field in light of the teachings herein. It is therefore understood that, within the scope of the claims, the present invention can be practiced other than as herein specifically described.

What is claimed is:

1. A treated, aluminum-alloy aircraft component prepared according to a method comprising the steps of:

providing an aluminum-alloy component having a faying surface, said component selected from the group consisting of wing and fuselage skin panels, stiffeners, frames, and hinges, said precursor curable to a final state;

providing a first coating material;

applying the first coating material to the component;

providing encapsulated second coating material to the first coating, said second coating material selected from the group consisting of phenolics, epoxies, melamines, polyurethanes, and polyureas;

depositing the second coating material to the component at a thickness of from about 0.0005 to about 0.0015 inch; and heat-treating the twice-coated component.

2. An aluminum-alloy, aircraft component prepared according to a method comprising the steps of:

providing an aluminum-alloy aircraft component having a faying surface, said component selected from the group consisting of wing and fuselage skin panels, stiffeners, frames, and hinges, said component curable to a final state;

providing a first coating;

providing an encapsulated second coating made from a material selected from the group consisting of phenolics, epoxies, melamines, polyurethanes, and polyureas;

applying the first and second coating to the component in sequential order;

providing a releasable film; and applying the releasable film to the component to cover the second coating.

3. An aluminum alloy-aircraft component prepared according to a method comprising the steps of:

providing an aluminum-alloy aircraft component having a faying surface, said surface selected from the group consisting of wing and fuselage skin panels, stiffeners, frames, and hinges, said precursor curable to a final state;

providing a first coating made from a material selected from the group consisting of polyurethanes, polyvinyl chlorides, silicones, epoxides, novolaks, acrylates, polyimides, melamines and phenolics;

applying the first coating to the component;

heat-treating the component;

providing an encapsulated second coating made from a material selected from the group consisting of phenolics, epoxies, melamines, polyurethanes, and polyureas;

applying the second coating to the first coating;

providing a releasable film; and applying the releasable film to the component to cover the second coating.

4. An aluminum-alloy component prepared according to a method comprising the steps of:

providing an aluminum-alloy aircraft component having faying surfaces, said component selected from the group consisting of wing and fuselage skin panels, stiffeners, frames, and hinges;

providing a first coating;

applying the first coating to the component to make a once-coated component;

providing a first heat-treatment to the component;

providing an encapsulated second coating;

applying a second coating to the first coating to make a twice-coated component, said second coating made from a material selected from the group consisting of a polyuethane or a polyurea; and providing a second heat treatment to the second coating.

5. An aircraft component comprising:

an aluminum alloy component having a faying surface, said component selected from the group consisting of wing and fuselage skin panels, stiffeners, frames, and hinges, said precursor curable to a final state;

a substantially uniformly deposited, encapsulated first corrosion-resistant, organic coating material deposited onto the component, said first coating having a thickness of from about 0.0050 inch to about 0.010 inch; and an encapsulated second coating made from a material selected from the group consisting of a polyurethane or a polyurea, said second coating substantially uniformly deposited to a thickness of from about 0.0005 inch to about 0.0015 inch onto the first coating.

6. An aircraft comprising aluminum alloy-containing components selected from the group consisting of wing and fuselage skin panels, stiffeners, frames, and hinges, said precursor curable to a final state, said components having faying surfaces, said components comprising:

an encapsulated first coating made from a material selected from the group consisting of polyurethanes, polyvinyl chlorides, silicones, epoxides, novolaks, acrylates, polyimides, melamides and phenolics; and an encapsulated second coating deposited onto the first coating, said second coating made from a material selected from the group consisting of phenolics, epoxies, melamines, polyurethanes and polyureas;

wherein said coatings and said components are substantially cured in one curing step.

7. The component of claim 1, wherein the first coating is encapsulated.

8. The component of claim 1, wherein the first coating is encapsulated.

9. The component of claim 3, wherein the first coating is encapsulated.

10. The component of claim 4, wherein the first coating is encapsulated.

* * * * *

UNITED STATES PATENT AND TRADEMARK OFFICE

CERTIFICATE OF CORRECTION

PATENT NO. : 6,475,610 B1
DATED : November 5, 2002
INVENTOR(S) : Keener et al.

It is certified that error appears in the above-identified patent and that said Letters Patent is hereby corrected as shown below:

Column 16,
Line 8, "polyuethane" should read -- polyurethane --;
Line 42, "claim 1" should read -- claim 2 --.

Signed and Sealed this

Eighth Day of April, 2003

JAMES E. ROGAN
*Director of the United States Patent and Trademark Office*